United States Patent [19]
Tsukamoto et al.

[11] Patent Number: 5,725,451
[45] Date of Patent: Mar. 10, 1998

[54] CONTROL SYSTEM FOR AUTOMATIC TRANSMISSION

[75] Inventors: Kazumasa Tsukamoto, Toyota; Masahiko Ando, Okazaki; Masahiro Hayabuchi; Akira Fukatsu, both of Anjo; Masato Kaigawa; Kagenori Fukumura, both of Toyota; Hidehiro Oba, Aichi-gun; Yasuo Hojo, Nagoya; Hiromichi Kimura; Atsushi Tabata, both of Okazaki, all of Japan

[73] Assignee: Aisin Aw Co., Ltd., Japan

[21] Appl. No.: 683,861

[22] Filed: Jul. 17, 1996

Related U.S. Application Data

[63] Continuation-in-part of Ser. No. 457,542, Jun. 1, 1995, abandoned.

[30] Foreign Application Priority Data

Jun. 2, 1994  [JP]  Japan ................. 6-142203
Sep. 27, 1994  [JP]  Japan ................. 6-256116

[51] Int. Cl.$^6$ ............................... F16H 61/00
[52] U.S. Cl. ...................................... 475/128
[58] Field of Search .......................... 475/127, 128

[56] References Cited

U.S. PATENT DOCUMENTS

| | | |
|---|---|---|
| 4,718,311 | 1/1988 | Hayakawa et al. |
| 4,982,624 | 1/1991 | Takada et al. |
| 5,109,734 | 5/1992 | Fujiwara |
| 5,133,231 | 7/1992 | Goto et al. |
| 5,203,234 | 4/1993 | Asada et al. |
| 5,291,804 | 3/1994 | Kashihara et al. |
| 5,293,789 | 3/1994 | Goto et al. |
| 5,363,724 | 11/1994 | Asahara et al. |
| 5,403,248 | 4/1995 | Ando et al. |
| 5,411,446 | 5/1995 | Hirose ............... 475/128 |
| 5,433,124 | 7/1995 | Person |
| 5,472,389 | 12/1995 | Ando et al. |
| 5,501,645 | 3/1996 | Taniguchi et al. |
| 5,505,673 | 4/1996 | Tsukamoto et al. |

FOREIGN PATENT DOCUMENTS

545385  6/1993  Japan.

*Primary Examiner*—Dirk Wright
*Attorney, Agent, or Firm*—Lorusso & Loud

[57] ABSTRACT

A control system for use in an automatic transmission which includes a gear shift mechanism having first and second frictional engagement elements for establishing: a first gear stage with the first frictional engagement element being applied and the second frictional engagement element being released; and a second gear stage with the first frictional engagement element being released and the second frictional engagement element being applied. The control system, in turn, includes: a first oil passage for feeding an oil pressure to the first frictional engagement element; a second oil passage for feeding an oil pressure to the second frictional engagement element; and a first valve arranged in the first oil passage for regulating the oil pressure of the first oil passage. At the time of a shift from the first gear stage to the second gear stage, the oil pressure of the first oil passage is regulated by the first valve responsive to the oil pressure of the second oil passage. The control system further includes a second valve arranged in the first oil passage for selectively feeding or shutting off the oil pressure of the first oil passage to and from the first frictional engagement element.

18 Claims, 15 Drawing Sheets

|      | C-0 | C-1 | C-2 | B-0 | B-1 | B-2 | B-3 | B-4 | F-0 | F-1 | F-2 |
|------|-----|-----|-----|-----|-----|-----|-----|-----|-----|-----|-----|
| N    |     |     |     | ○   |     |     |     |     |     |     |     |
| Rev  |     |     | ○   | ○   |     |     |     | ○   |     |     |     |
| 1st  | ○   | ○   |     |     |     |     |     | ●   | ○   |     | ○   |
| 2nd  | ●   | ○   |     |     |     |     | ○   |     | ○   |     |     |
| 3rd  | ○   | ○   |     |     | ●   | ○   |     |     | ○   | ○   |     |
| 4th  | ○   | ○   | ○   |     |     | ◉   |     |     | ○   |     |     |
| 5th  |     | ○   | ○   | ○   |     | ◉   |     |     |     |     |     |

5,725,451

CONTROL SYSTEM FOR AUTOMATIC TRANSMISSION

CROSS-REFERENCE TO RELATED APPLICATION

The present application is a Continuation-in-part of U.S. Ser. No. 08/457,542, filed Jun. 1, 1995, now abandoned.

BACKGROUND OF THE INVENTION

1. Field of the Invention

The present invention relates to a control system for an automatic transmission and, more particularly, to a control system for switching between the engaged/released states of frictional engagement elements in a transmission mechanism so as to effect an automatic speed change.

2. Related Art

Prior art automatic transmissions effect a so-called "grip-changing operation" in which the application of one of two frictional engagement elements (e.g., brakes or clutches) and the release of the other are simultaneously performed at the time of shifting between specific two gear stages. For this purpose, one-way clutches are usually arranged in parallel with the individual frictional engagement elements to optimize the applying/releasing timings and to thereby avoid a drop in the output shaft torque due to tie-up and avoid engine racing due to under-lap. However, in order to make the transmission mechanism more compact, omission of the one-way clutch may be desirable. In this case, oil pressure feeding/releasing oil passages for the two frictional engagement elements must be provided with dedicated valves for controlling the release of the oil pressure from one frictional engagement element and the oil pressure feed to the other, in a related manner. A control system thus constructed is exemplified in the prior art by that disclosed in Japanese Patent Application Laid-Open No. 157168/1993. In the system of this disclosure, a valve (i.e., the 2–3 timing valve) is provided for controlling the oil pressure (hereinafter "releasing pressure") of the frictional engagement element (corresponding to brake B-3 in the embodiments of the present invention) at the side to be released at the time of shifting from a 2nd speed to a 3rd speed (hereinafter abbreviated as 2nd→3rd, as in the other shifts).

The prior art system mentioned above, includes an accumulator for compensating for an over-drop in the releasing pressure. However, this accumulator occupies a large space in of the hydraulic control system because it must have capacity for accumulating a large amount of oil and thereby prevents a compact construction. In our earlier Japanese Patent Application published as Kokai No. 157986/1993, we disclosed a hydraulic control system in which the releasing pressure at the time of a grip-change shift (from the 2nd→3rd speeds) is controlled exclusively by a control valve, without use of an accumulator. In this earlier system, the control valve regulates the releasing pressure of the frictional engagement element (i.e., the brake B-3) engaged at the 2nd speed and the D-range pressure, corresponding to the signal oil pressure, to be fed to the other frictional engagement element (i.e., the brake B-2) to thereby engage the latter element in 3rd speed and thereby achieve a 2nd→3nd shift. The releasing pressure of the released side frictional engagement element (i.e., the brake B-3) is reduced by the control valve in accordance with the rise of the oil pressure feed (hereinafter "applying pressure") to the engaging side frictional engagement element (i.e., the brake B-2). With this construction, however, when a malfunction occurs in the control valve, release of the frictional engagement elements cannot be properly controlled in a grip changing shift. In our earlier system, moreover, the original releasing pressure in the 2nd→3rd shift passes through the 2-3 shift valve so that the 2-3 shift valve is switched for the 2nd→3rd shift. This valve switching creates another problem in that the releasing pressure of the releasing side frictional engagement element drops until the baseline (predetermined) pressure, i.e. the pressure fed to the control valve, is re-established.

SUMMARY OF THE INVENTION

Therefore, the present invention has, as its main objective, provision of a control system capable of preventing the simultaneous feed of oil pressures to both frictional engagement elements involved in a grip-changing shift within an automatic transmission.

A second object of the present invention is to prevent the aforementioned simultaneous feed with a simple construction.

A third object of the present invention is to retain the applying pressure in the event of a failure in the control system.

A fourth object of the present invention is to make the control system compact.

A fifth object of the present invention is to prevent any delay in the application of a frictional engagement element at the start of a higher gear stage.

A sixth object of the present invention is to prevent a transient drop of the application (engaging) pressure in the grip-changing shift.

In order to achieve the first objective, the present invention provides an automatic transmission for establishing a first gear stage with a first frictional engagement element applied and a second frictional engagement element released and a second gear stage wherein the first frictional engagement element is released and the second frictional engagement element is applied. The control system for this transmission, in accordance with the present invention, includes a first oil passage for feeding an oil pressure to the first frictional engagement element; a second oil passage for feeding an oil pressure to the second frictional engagement element; a first valve arranged in the first oil passage for regulating the oil pressure of the first oil passage whereby, in a shift from the first gear stage to the second gear stage, the oil pressure of the first oil passage is regulated by the first valve which receives the oil pressure of the second oil passage; and a second valve arranged in the first oil passage for selectively feeding or shutting off communication of the oil pressure of the first oil passage with the first frictional engagement element.

In order achieve the second stated objective, the second valve is arranged between the first valve and the first frictional engagement element for reducing the oil pressure of the first oil passage to that of the oil pressure coming from the second frictional engagement element.

In order to achieve the third objective, the second valve has a by-pass oil passage capable of feeding the oil pressure to the first frictional engagement element irrespective of the position of the second valve.

In order to achieve the fourth object, moreover, the second valve regulates an oil pressure in addition to that of the first oil passage.

In order to achieve the fifth objective, the second valve shuts off the oil pressure to the first valve at the time of a shift from the gear stage in which both the first frictional engagement element and the second frictional engagement element are released, to the second gear stage.

In order to achieve the sixth objective, the control system may further include a first change-over valve for switching the feed of the oil pressure from the first oil passage to the second oil passage at the time of shift from the first gear stage to the second gear stage; and a second change-over valve for feeding the oil pressure to the first oil passage upstream of the first valve.

DESCRIPTION OF THE PREFERRED EMBODIMENTS

Figure 1:
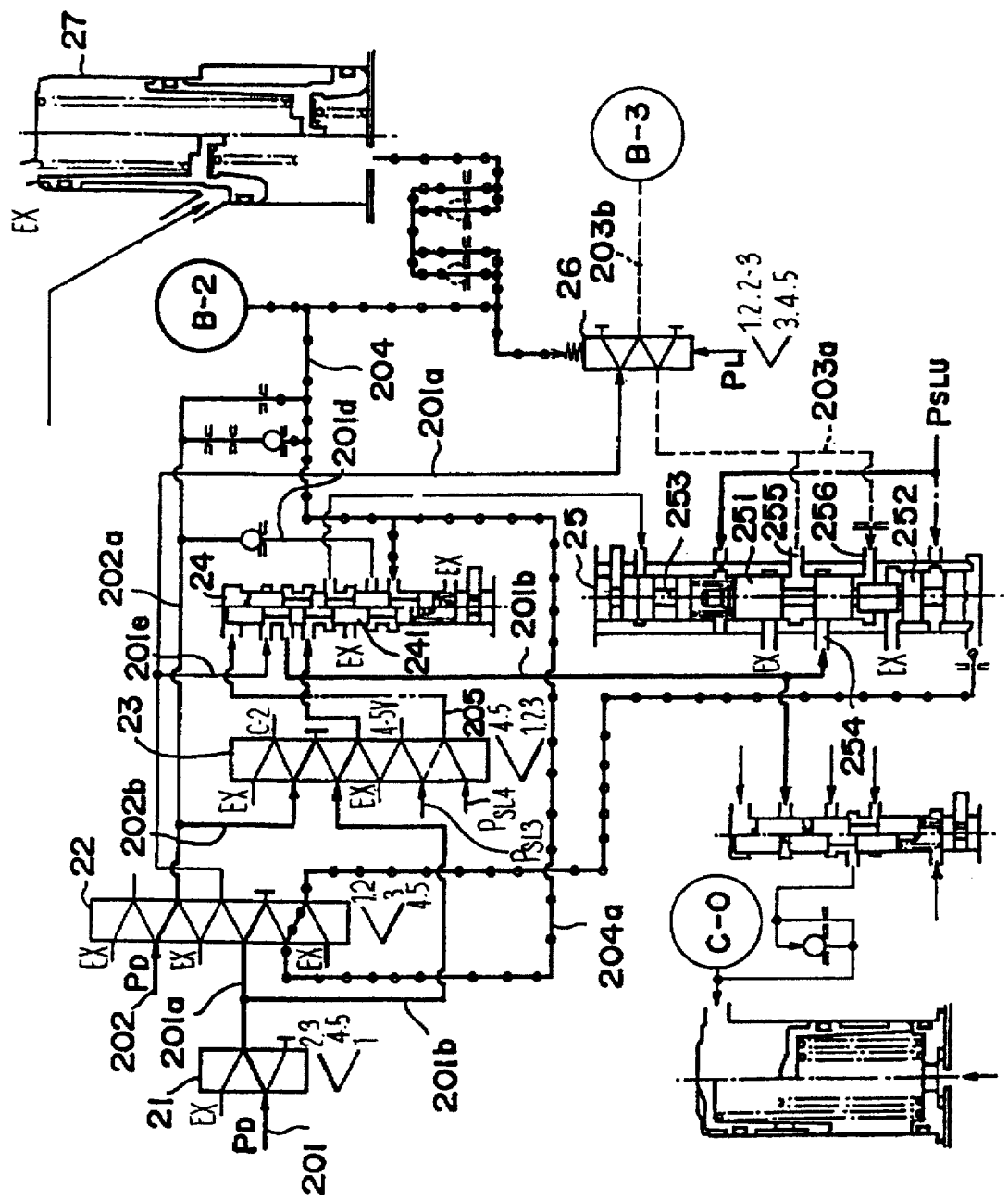
FIG. 1 is a circuit diagram of a portion of a hydraulic control system for an automatic transmission according to a first embodiment of the present invention.
Figures 2, 3:
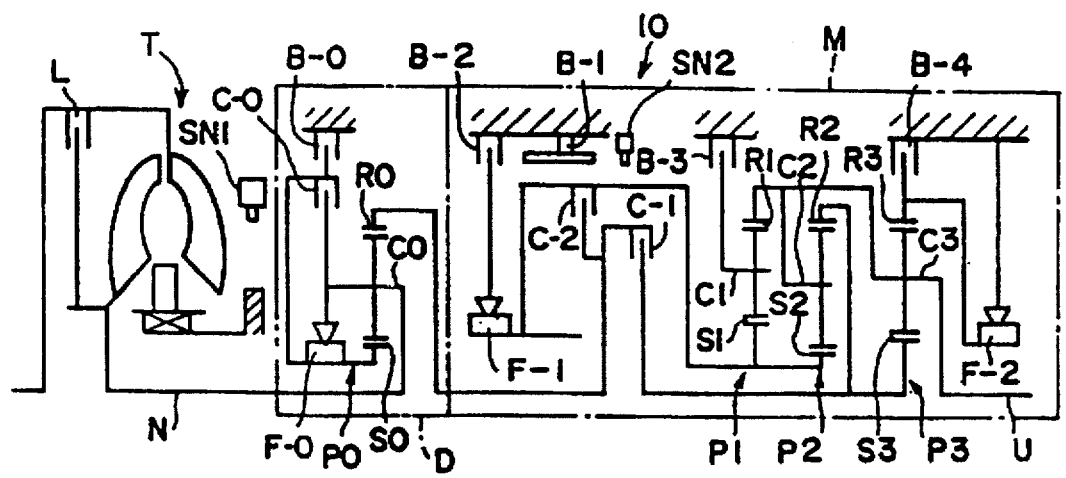
FIG. 2 is a skeletal diagram of the mechanical portion of the automatic transmission.
FIG. 3 is an operation chart for the automatic transmission.

FIGS. 1 to 10 and 17 show a first embodiment of the present invention. As shown in FIG. 2, an automatic transmission 10 has a mechanical portion providing five speeds by combining an auxiliary transmission D (a pre-overdrive planetary gear unit) with a main transmission mechanism M (three simply connected planetary gear trains) to establish four forward speeds and one reverse. The mechanical portion is connected to a torque converter T having a lockup clutch L.

The auxiliary transmission mechanism D includes: a one-way clutch F-0 in association with a sun gear S0, a carrier C0 and a ring gear R0; a multi-disc clutch C-0 in parallel with the one-way clutch F-0; and a multi-disc brake B-0 in series with the multi-disc clutch C-0. On the other hand, the main transmission mechanism M includes three simply connected planetary gear units P1 to P3 composed of sun gears S1 to S3, carriers C1 to C3 and ring gears R1 to R3. The main transmission mechanism M has multi-disc clutches C-1 and C-2, a band brake B-1, multi-disc brakes B-2 to B-4, and one-way clutches F-1 and F-2 in association with the various elements of the gear units. Incidentally, in FIG. 2, SN1 designates a C0 sensor for detecting drum rotation in the clutch C-0, and SN2 designates a C2 sensor for detecting drum rotation of the clutch C-2. Moreover, the individual clutches and brakes are equipped with hydraulic servo units composed of piston-cylinder mechanisms for applying/releasing their friction members.

Figure 4:
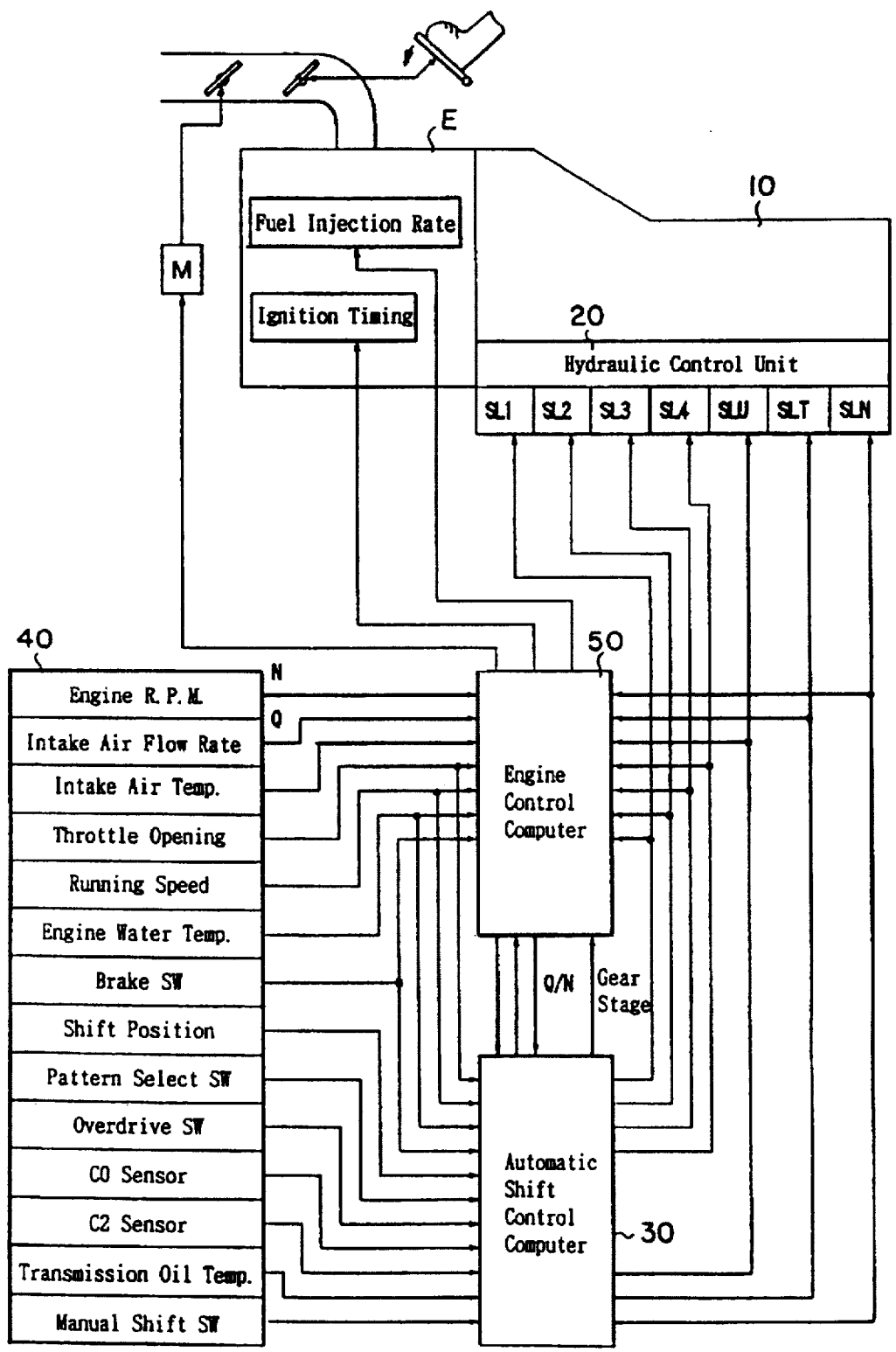
FIG. 4 is a block diagram of the control system according to the present invention.

As shown in FIG. 4, the automatic transmission 10 includes a hydraulic control system 20 for controlling the above-mentioned mechanical portion, a torque converter T and lockup clutch L. An oil pump (not shown) is built into the mechanical portion and serves as the oil pressure source for the hydraulic control system 20. The automatic transmission 10 is connected, when mounted on the vehicle, to an engine E and has its hydraulic control system 20 connected to an automatic transmission control computer 30 through individual solenoid valves SL1 to SL4 and individual linear solenoid valves SLN, SLT and STU, which are built into the hydraulic control system 20. The automatic transmission control computer 30 is connected to a variety of sensors 40, which are arranged in the individual portions of the vehicle including the engine E and the automatic transmission 10; and an engine control computer 50. In this automatic transmission 10, the rotation of the engine E shown in FIG. 4 is transmitted to the input shaft N of the auxiliary transmission mechanism D through the torque converter T shown in FIG. 2, to continuously rotate the carrier C0 connected to the input shaft N. This rotation of the carrier C0 is isolated from output shaft U to establish a neutral state, with all the frictional engagement elements being released or only the brake B-0 being applied, under control of the aforementioned hydraulic control system. The 1st-speed rotation is input to the sun gear S3 of the gear unit P3 through the ring gear R0 and the clutch C-1, with the clutch C-0 being applied to directly connect the auxiliary transmission mechanism D, with the clutch C-1 of the main transmission mechanism M being applied, and with all the remaining frictional engagement elements being released, and is output as the 1st-speed rotation to the output shaft U from the carrier C3 by obstructing reverse rotation of the ring gear R3 with the one-way clutch F-2.

A 2nd-speed, i.e., the 1st gear stage in this embodiment, is established when the auxiliary transmission mechanism D is directly connected so that the clutch C-1 and the brake B-3, corresponding here to the first frictional engagement element, are applied. At this time, the input to the ring gear R2 of the gear unit P2, via a route like that of the 1st speed, is output, using the carrier C1 of the gear unit P1 as a reaction element, to the carrier C2 of the gear unit P2 and the ring gear R1 of the gear unit P1, R1 being directly connected to C2, so that it establishes the 2nd-speed rotation of the output shaft U. 3rd-speed, i.e., the 2nd gear stage in this embodiment, is established, also with the auxiliary transmission mechanism D directly connected, by applying the clutch C-1 and the brake B-2, corresponding here to the second frictional engagement element, while releasing the other frictional engagement elements. At this time, the input, having been input to the ring gear R2 of the gear unit P2 via a route similar to that in 2nd speed, is output to the carrier C2, with the sun gear S2 acting as a reaction element, to establish 3rd-speed rotation of the output shaft U.

4th-speed is established, also with auxiliary transmission mechanism D directly connected, by applying both the clutch C-1 and the clutch C-2. At this time, the input rotation is input to the ring gear R2 and the sun gear S2 so that the gear unit P2 is directly connected to output the input rotation as is. On the other hand, 5th-speed is established when the main transmission mechanism M is in the state of the aforementioned 4th-speed and in an overdrive state in which the clutch C-0 is released and the brake B-0 is applied to fix the sun gear S0, to thereby accelerate the auxiliary transmission mechanism D.

On the other hand, reverse is established, when the auxiliary transmission mechanism D is in the aforementioned state, by applying the clutch C-2 and the brake B-4 of the main transmission mechanism M. At this time, the input to the sun gear S2 of the gear unit P2 is output as reverse rotation of the carriers C2 and C3 of the gear units P2 and P3, with the ring gear R3 acting as a reaction element.

The applied/released relationships of the individual frictional engagement elements and the one-way clutches in the aforementioned individual gear stages are tabulated in the operation chart of FIG. 3. In FIG. 3: blank circles designate application of a clutch or brake and the locked state for the one-way clutches; solid circles designate application only at the time of engine braking; a broken circle designates application or release; and double circles designate application without the participation in the power transmission.

FIG. 1 shows the circuit portions which directly participate in the regulation and the feed/release of oil pressures to/from the hydraulic servo units for apply/release of the brake B-3, i.e. the first frictional engagement element, and of the brake B-2, i.e. the second frictional engagement element. As shown in FIG. 1, a first oil passage 201b feeds the oil pressure to the brake B-3 and a second oil passage 202a feeds the oil pressure to the brake B-2. The B-3 control valve 25, arranged in the first oil passage 201b, acts as a first valve for regulating the oil pressure in that first oil passage. Thus, in this embodiment the oil pressure of the first oil passage 201b is regulated by the B-3 control valve 25 in the 2nd→3rd shift in accordance with the oil pressure of the second oil passage 202a.

The first oil passage 201b is arranged with a relay valve 26, a B-2 release valve 24 and a 3–4 shift valve 23, which are separate from the B-3 control valve 25 and together act as a "second valve" for regulating the oil pressure of the first oil passage 201b. The relay valve 26 is arranged between the B-3 control valve 25 and the brake B-3 and acts to reduce the oil pressure of the first oil passage 201b in accordance with the oil pressure from the brake B-2. The relay valve 26 is formed with an oil passage capable of feeding the oil pressure to the brake B-3 irrespective of its position. Moreover, the relay valve 26, the B-2 release valve 24 and the 3–4 shift valve 23, which together constitute the "second valve," coact to regulate an oil pressure in addition to that of the first oil passage 201b. Specifically, the relay valve 26 also acts as a valve for controlling a linear solenoid signal pressure ($P_{SLU}$), and the B-2 release valve 24 acts as a valve for controlling the brake B-2. These valves also function to shut off the oil pressure to the B-3 control valve 25 at the time of shift from a gear stage (or neutral), in which both the brake B-3 and the brake B-2 are released, to the 3rd speed.

This circuit further includes a 2–3 shift valve 22 acting as a first change-over valve for switching the feed of the oil pressure from the first oil passage 201b to the second oil passage 202a; a 1–2 shift valve 21 acting as a second change-over valve for feeding the oil pressure to the first oil passage 201b upstream of the B-3 control valve 25; and a B-2 accumulator 27.

The hydraulic components mentioned above are controlled by solenoid valves SL1 to SL4 which, as shown in FIG. 4, serve to switch the individual shift valves, by the lockup linear solenoid valve SLU, by the accumulator control linear solenoid valve SLN, which controls the B-2 accumulator 27 and the back pressure of the same, and by the linear solenoid valve SLT which outputs a control signal, according to the engine load, to the linear solenoid valve SLU.

Thus, the foregoing hydraulic circuit constitutes a control system for feeding oil pressure to the first oil passage 201b and the second oil passage 202a through the 1–2 shift valve 21 and the 2–3 shift valve 22 at the time of shift from the neutral N to the 2nd gear stage (i.e., the 3rd speed (or 3rd) in this embodiment) and for regulating the release of the oil pressure from the brake B-3 by the B-3 control valve 25, in accordance with the applying oil pressure to the brake B-2, at the time of shift from the 1st gear stage (i.e., the 2nd speed (or 2nd)) to the 2nd gear stage (i.e., the 3rd speed (or 3rd)).

The control valve 25, located in the oil passage for feeding/releasing oil pressure to/from for the brake B-3, includes a spool 251 which receives the feedback oil pressure of the brake B-3 in a valve closing direction (i.e., upward in the drawing) from an oil passage 203a and an external control signal oil pressure (i.e., the signal pressure output from the linear solenoid valve SLU) $P_{SLU}$ in an opposite, valve-opening direction (i.e., downward in the drawing), to regulate the oil pressure of the brake B-3 in accordance with those received pressures. A plunger 252 is arranged coaxially with the spool 251 and receives the oil pressure of the brake B-2 in the valve closing direction (i.e., upward in the drawing), at the time of a grip-change shift applying the brake B-2 and releasing the brake B-3, and receives the linear solenoid valve SLU signal pressure in the valve opening direction (i.e., downward in the drawing) at least at the time of the aforementioned shift. When the oil pressure of the brake B-2 is applied, the plunger 252 is brought into abutment against the spool 251 so that it interlocks with the spool 251.

The 2–3 shift valve 22 serves to switch the feed of the oil pressure to the first oil passage 201b and the second oil passage 202a at the time of a shift between the 1st gear stage (or 2nd) and the 2nd gear stage (or 3rd). The 1–2 shift valve is retained in a predetermined position at the time of a shift from the 1st gear stage (or 2nd) to the 2nd gear stage (or 3rd). The first oil passage 201b is connected to the 1–2 shift valve 21 while bypassing the 2–3 shift valve 22. As a result, the oil pressure for regulating the brake B-3 oil pressure is fed to the control valve 25 via the oil passage 201b through the 1–2 shift valve 21 which is not switched but, rather, is retained in the predetermined position at the time of a grip-change shift.

The relay valve 26, is located between lines 203a and 203b, which form part of the first oil passage, and between the control valve 25 and the brake B-3 and serves to control the feed and release of the oil pressure to and from the brake B-3 in accordance with the oil pressure from the brake B-2. Relay valve 26 also serves to shut off the first oil passage 203a in its release position (the in-valve by-pass oil passage is indicated by the rightward, downward line in FIG. 1) where it drains the oil pressure from the brake B-3.

The connections between the aforementioned individual valves and oil passages will now be described in detail. A D-range oil passage 201 leading to the manual valve (not shown) is branched through the 1-2 shift valve 21, and one branch oil passage 201a is connected through the 2-3 shift valve 22 to the relay valve 26 and through the relay valve 26 to a brake B-3 oil passage 203b The other branch oil passage 201b leads through the 3-4 shift valve 23 and the B-2 release valve 24 to the in-port 254 of the B-3 control valve 25, from which the oil passage 201b is connected through an oil passage 203a to the relay valve 26.

The other D-range pressure oil passage 202 leading to the manual valve is branched through the 2-3 shift valve 22, and one branch oil passage 202a is connected through an orifice to a brake B-2 oil passage 204. This oil passage 204 is connected through the B-2 release valve 24 and a check valve to the oil passage 202a and through an orifice to the accumulator 27. The other branch oil passage 202b is connected through the 3-4 shift valve 23 to the clutch C-2o The 3-4 shift valve 23 is a change-over valve which is switched in response to the signal pressure from the solenoid valve SL2 at the time of a shift from the 3rd speed to the 4th speed, or vice versa, and is connected through a solenoid valve signal pressure oil passage 205 (as indicated by double-dotted lines in FIG. 1) to the B-2 release valve 24, so as not only to connect and disconnect the communication between the two oil passages 201b and 202b, but also to apply a solenoid valve SL3 signal pressure ($P_{SL3}$) or a solenoid valve SL4 signal pressure ($P_{SL4}$) selectively to the spool end of the B-2 release valve 24.

The B-2 release valve 24 is formed with a bypass for accelerating the drainage of the oil passage of the accumulator 27 located at the release end of the brake B-2 and is equipped with a spring-loaded spool 241. The B-2 release valve 24 receives, at one end of its spool 241, the signal pressure ($P_{SL3}$) of the solenoid valve SL3 by way of the 3-4 shift valve 23, so as to connect and disconnect the communication of a bypass oil passage 201d with the brake B-2 oil passage 204, to switch the communication of the D-range pressure oil passage 201b between the in-port 254 of the B-3 control valve 25 and a signal port at the end of a plunger 253, and to connect and disconnect the communication of an oil passage 201e, branched from the other D-range pressure oil passage 201a, with the oil passage 201b. As a result, the in-port 254 of the B-3 control valve 25 can be fed with a D-range pressure ($P_D$) from the two oil passages 201b and 201e through the 1-2 shift valve 21 in parallel with the 2-3 shift valve 22 and the 3-4 shift valve 23.

Figure 17:
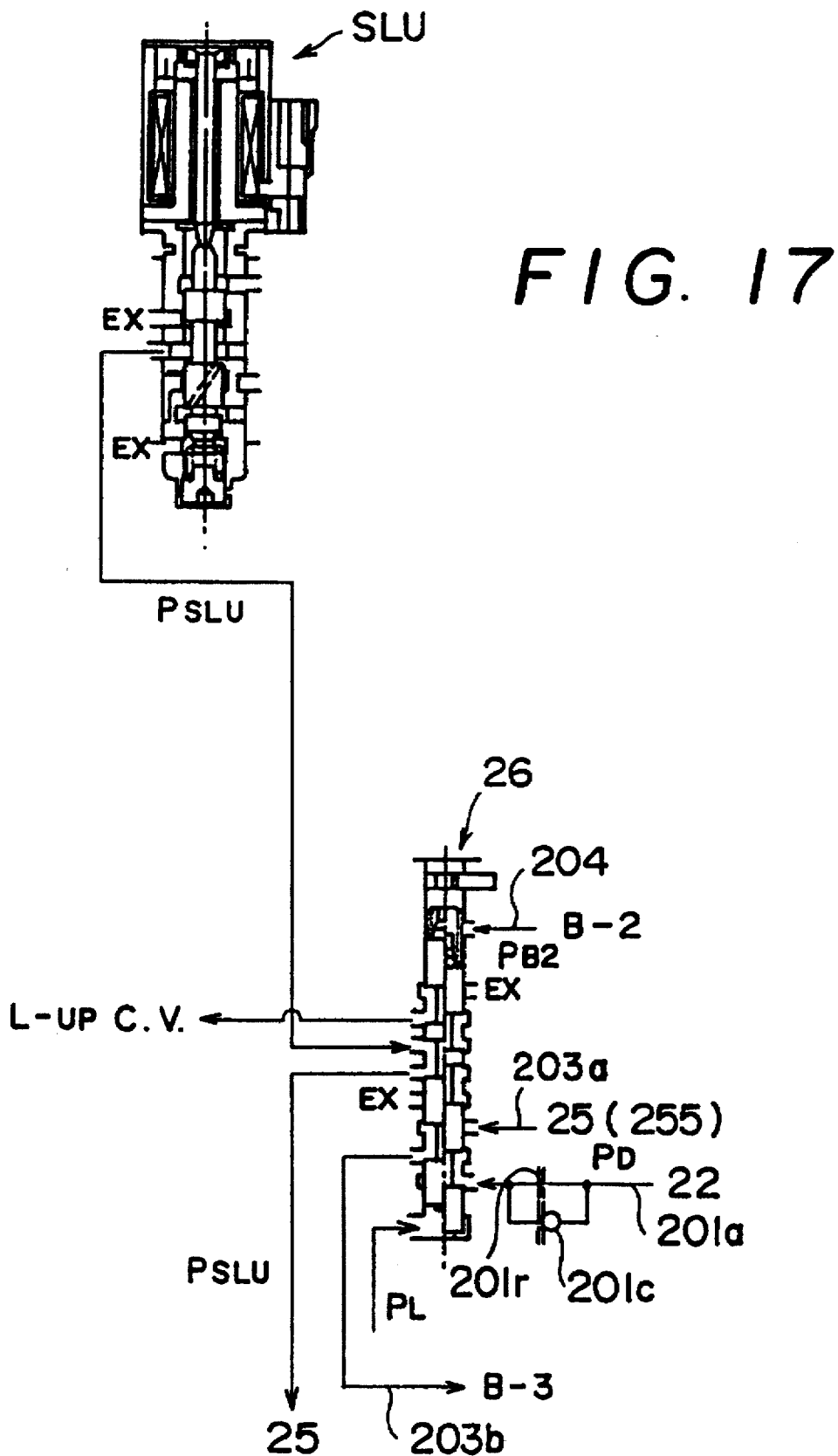
FIG. 17 is a partial hydraulic circuit diagram showing the detail of a relay valve in the first mode, together with its circuit connections.

The B-3 control valve 25 is constructed so that the oil pressure of the oil passage 203a leading to an out-port 255 is regulated by controlling the in-port 254 with one land and a drain port EX with the other of two lands formed on the spool 251, by a feedback pressure fed to the end of the spool 251 through a feedback signal pressure in-port 256. Further, the plunger 252 is arranged coaxially with the spool 251 and is formed into a differential piston shape for movement into and out of abutment against the spool 251 responsive to the linear solenoid signal pressure ($P_{SLU}$) and to receipt at its end face of the brake B-2 pressure through oil passage 204 of the brake B-2, through oil passage 204a, and through the 2-3 shift valve 22. This B-3 control valve 25 also has a plunger 253 which is disposed at the opposite end of the plunger 252 for changing the spring load upon the spool 251, such that the D-range pressure ($P_D$) of the oil passage 201b can be applied to and released from the end face of the plunger 253 through the B-2 release valve 24. The relay valve 26, as specifically shown in FIG. 17, is a spring-loaded spool type change-over valve, and the brake B-2 pressure ($P_{B2}$) of the oil passage 204 and a line pressure ($P_{P2}$) are fed in opposite directions, respectively, to the end of the spool at the spring-loaded side and to the other spool end, to switch the communication of the brake B-3 oil passage 203b between the oil passages 201a and 203a. As a result, the relay valve 26 is always capable of feeding oil pressure to the brake B-3, in either of its two switched positions, irrespective of the spring force. The oil passage 201a is provided with an orifice 201r for smoothening the feed of the oil pressure to the brake B-3 should the relay valve 26 fail and with a check valve 201c, for increasing the rate of drainage of the oil pressure from the brake B-3 in parallel with the orifice 201r. Incidentally, the main role of the relay valve 26 is to switch the feeds of the oil pressure ($P_{SLU}$) of the linear solenoid valve SLU to the lockup control valve L-up C.V. (although not shown) during lockup control and to the B-3 control valve 25 at the time of a 2nd→3rd shift.

Figure 5:
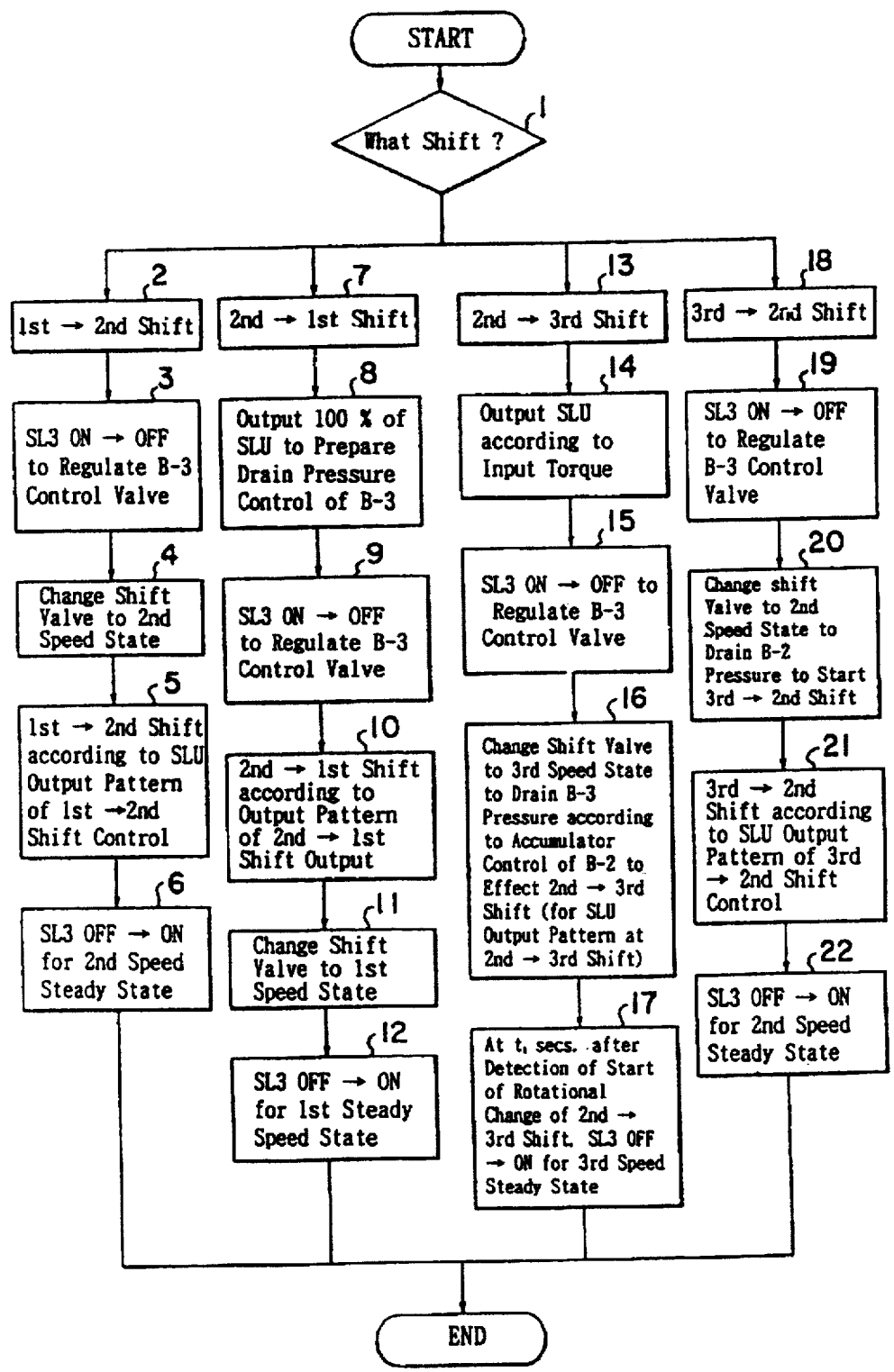
FIG. 5 is a flow chart of operation of the control system of the present invention.

The operations of the circuit thus constructed will now be described with reference to the flow chart of FIG. 5 and the time charts of FIGS. 7 to 10.

(1) 1st→2nd Shift Control Operations

Figure 6:
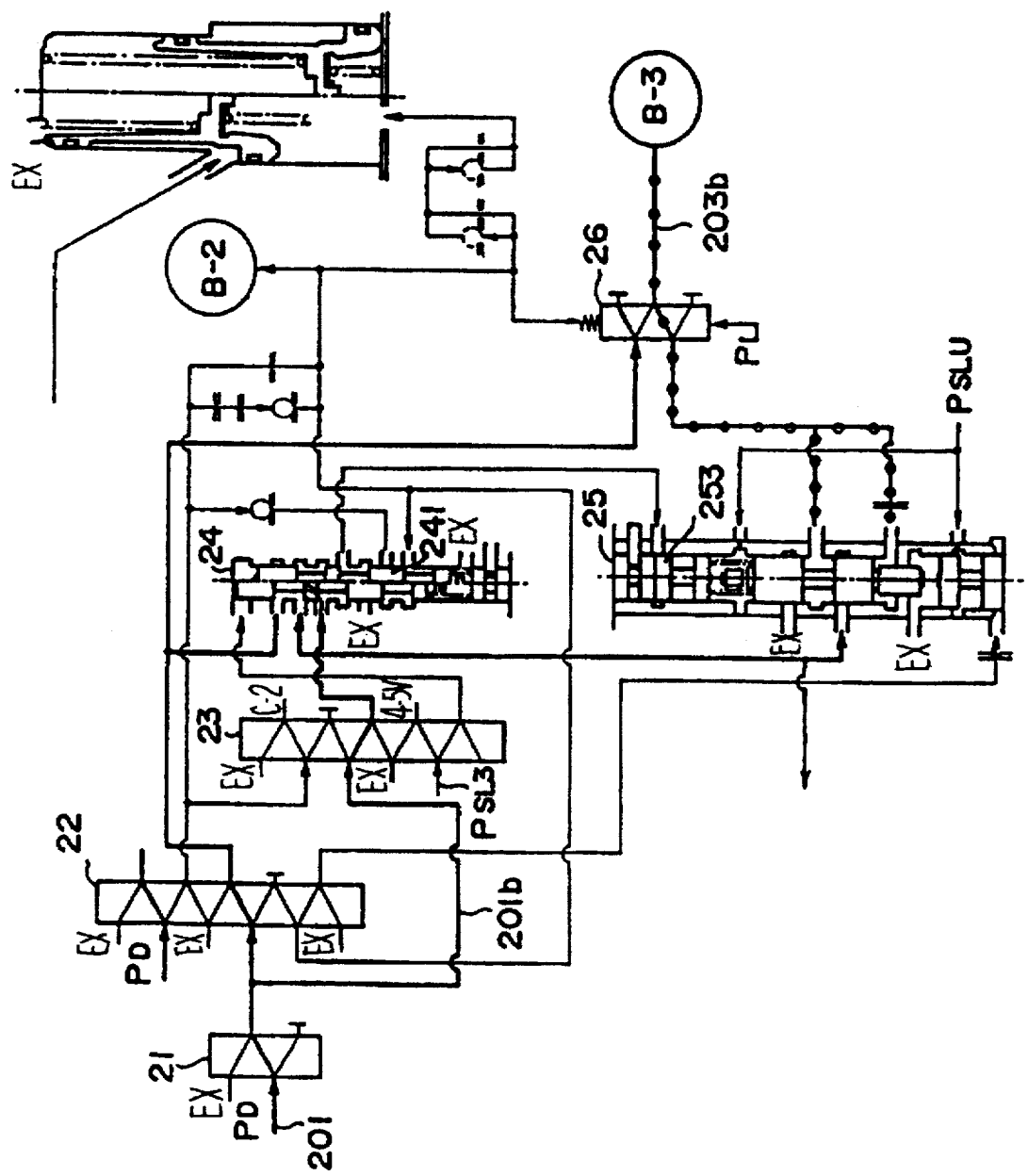
FIG. 6 is a hydraulic circuit diagram showing the connections of oil passages at the time of a 1st→2nd shift.
Figure 7:
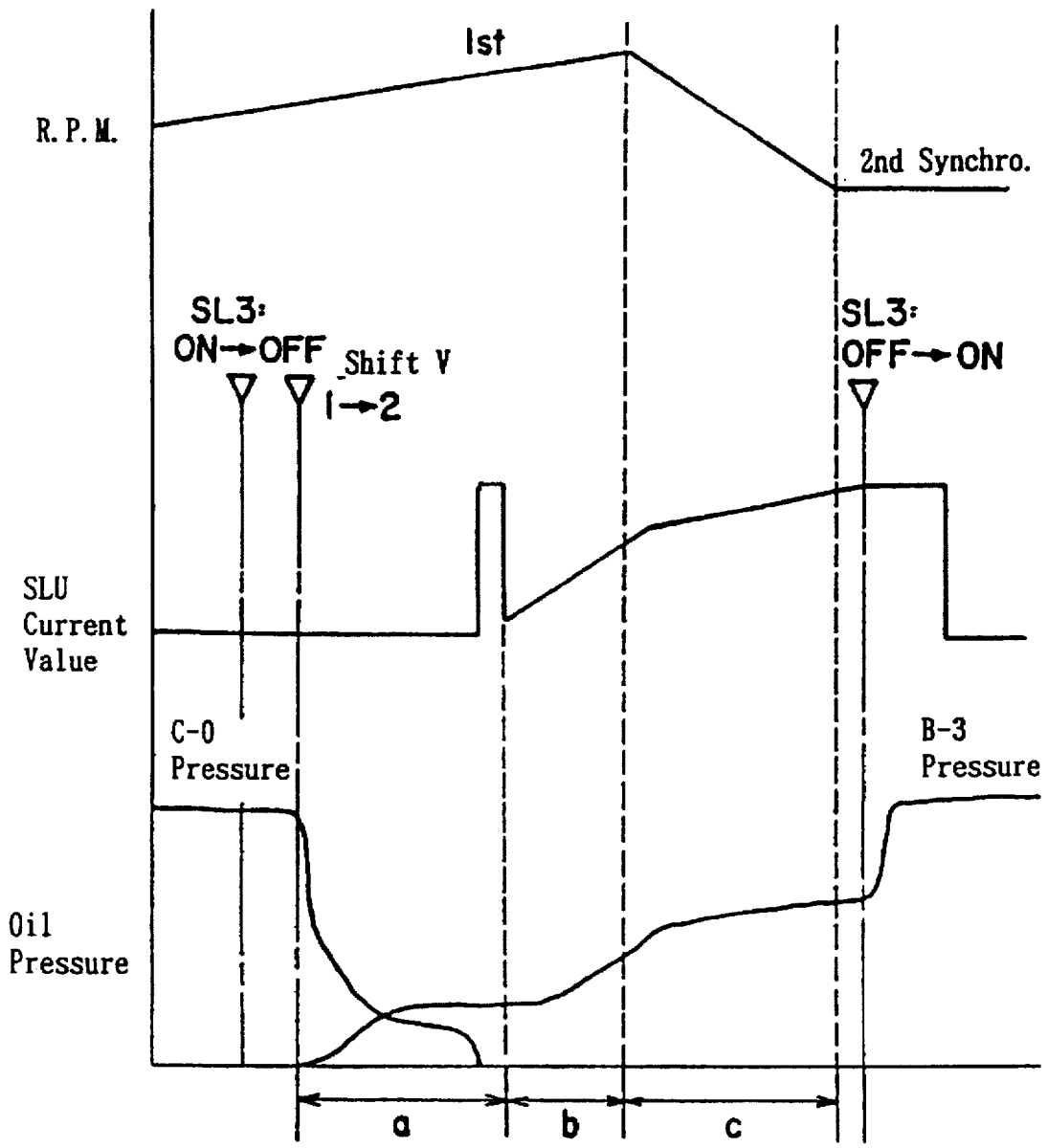
FIG. 7 is a time chart for a 1st→2nd shift.
Figure 8:
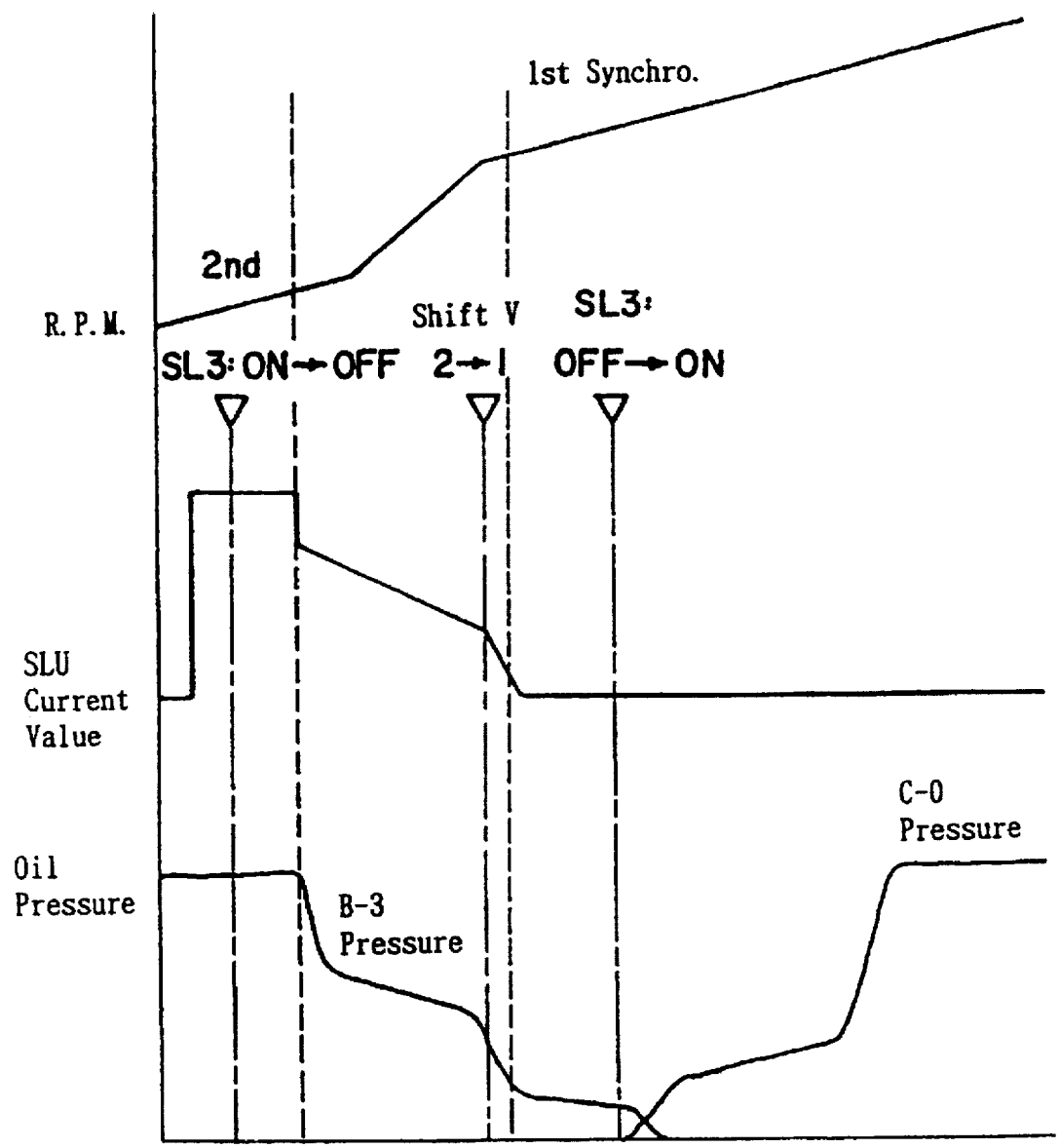
FIG. 8 is a time chart for a 2nd→1st shift.
Figure 9:
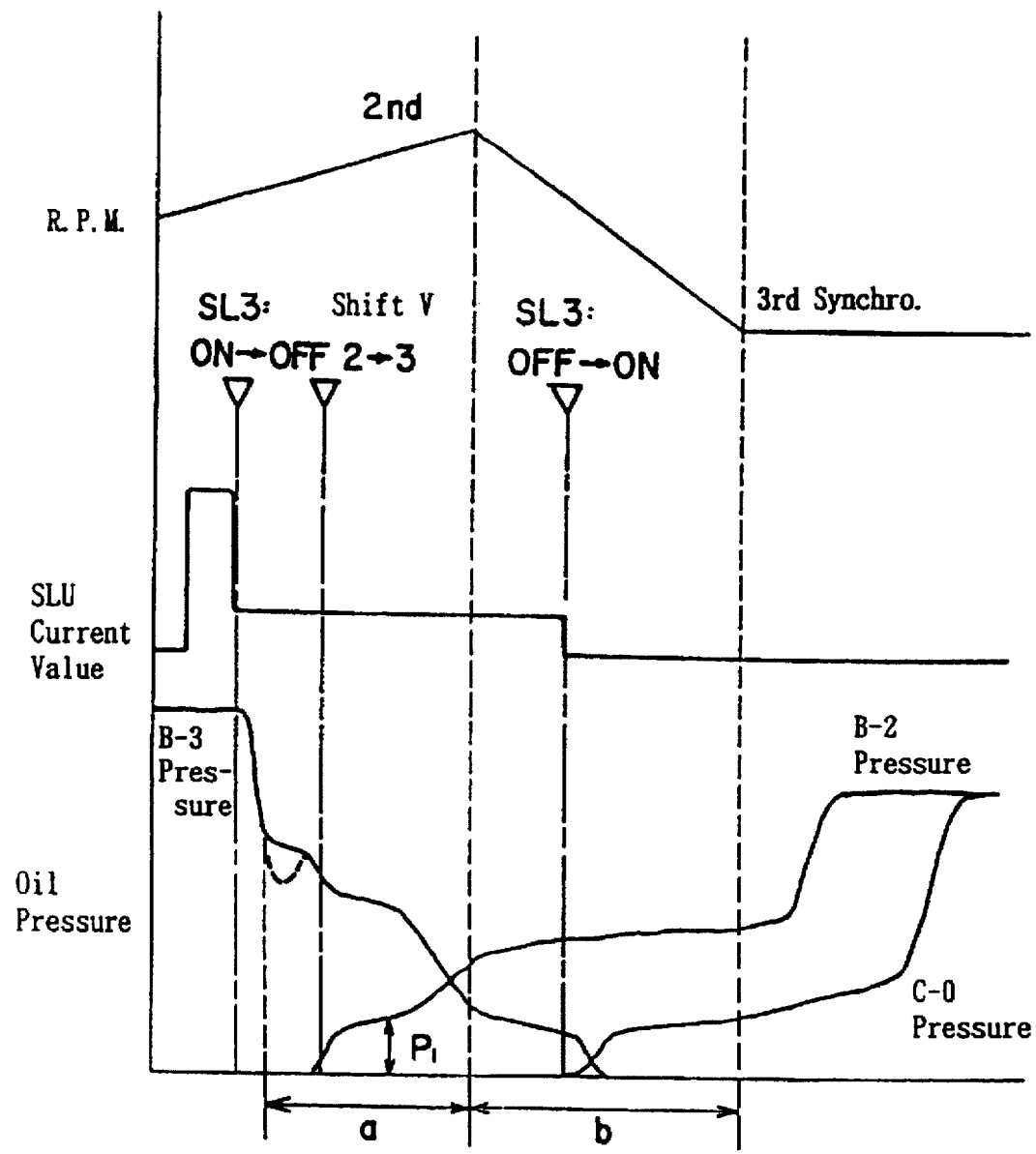
FIG. 9 is a time chart for a 2nd→3rd shift.
Figure 10:
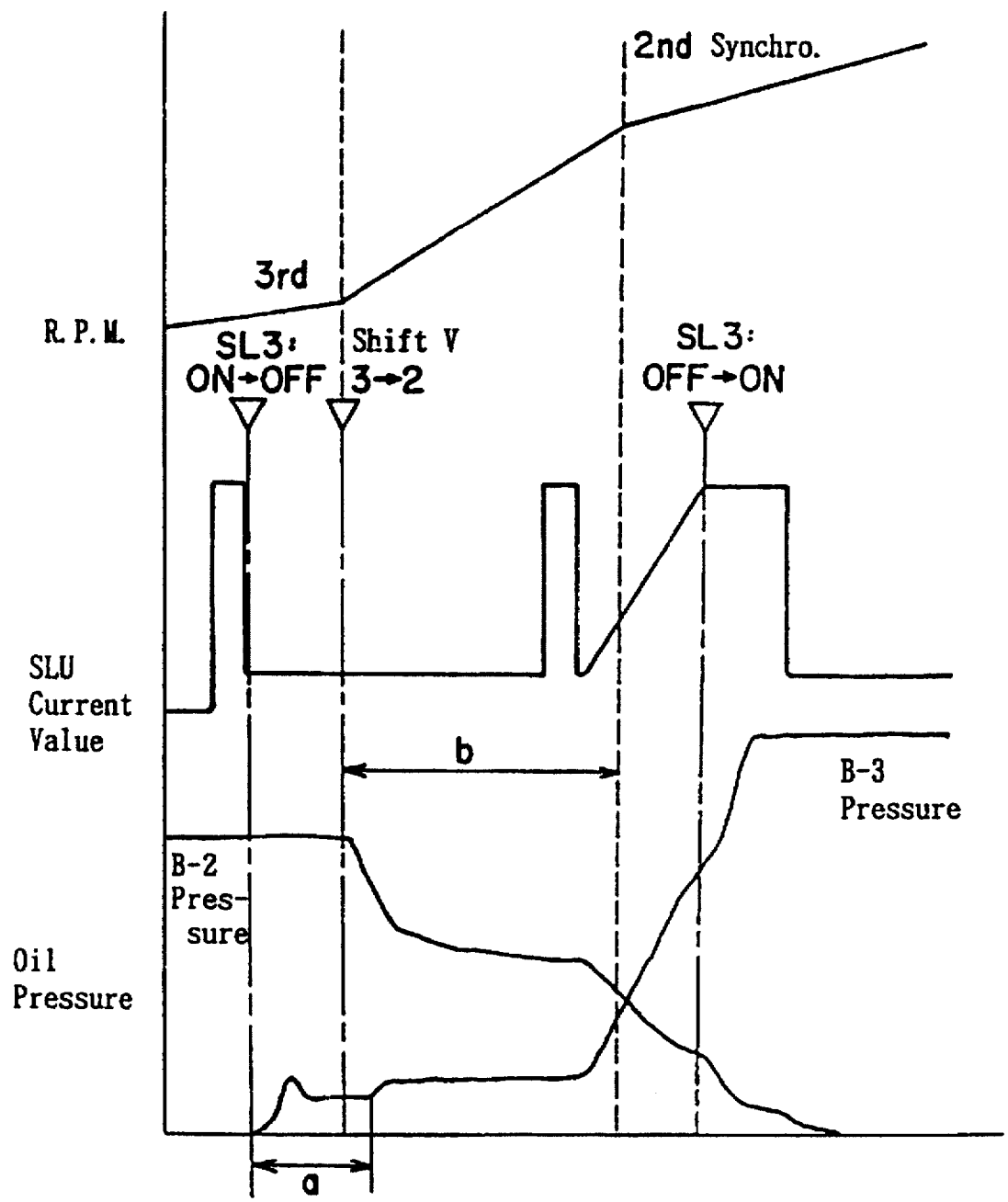
FIG. 10 is a time chart for a 3rd→2nd shift.

If the 1st→2nd shift of Step 2 is decided at Step 1, the solenoid valve SL3 is switched from ON to OFF in Step 3, prior to the switching of the 1-2 shift valve 21, to bring the B-2 release valve 24 to the position shown as the righthand half in FIG. 6. In Step 4, the 1-2 shift valve 21 is changed to a 2nd- speed state to feed the servo means through the relay valve 26 and the oil passage 203b with the D-range pressure ($P_D$), received through the (not-shown) manual valve, the oil passage 201, the 1-2 shift valve 21, the oil passage 201b, the 3-4 shift valve 23 and the B-2 release valve 24, as the brake B-3 pressure through the B-3 control valve 25, and to drain the clutch C-0 pressure. During the remainder of the control routine, the brake B-3 pressure during periods a, b and c, as shown in FIG. 7, is directly controlled by the B-3 control valve according to Step 5. Specifically, during the piston stroke of the servo means, (corresponding to period a), the oil pressure level for the fast fill is set by the force of the return spring of the servo means. During period b, the output ($P_{SLU}$) of the linear solenoid valve SLU is raised at a predetermined rate to change the rotational speed. In period c, the linear solenoid valve SLU is subjected to feedback control according to a target rotational speed change. After completion of the 1st→2nd speed shift (i.e., when 2nd speed synchronization is achieved), the solenoid valve signal pressure ($P_{SL3}$) is released at Step 6, responsive to a switch of the solenoid valve SL3 to ON, to change the B-2 release valve 24 to the position shown as the lefthand half in FIG. 6. With the B-2 release valve 24 in this position, the D-range pressure ($P_D$) is applied through the B-2 release valve 24 to the plunger 253 of the B-3 control valve 25. On the other hand, the D-range pressure ($P_D$) routed through another passage of the 2-3 shift valve and through the B-2 release valve 24, is continuously fed to the servo means through the B-3 control valve 25 to raise the brake B-3 pressure quickly to the line pressure ($P_L$) until the shift is ended. As a result, in the 2nd-speed (2nd) steady state, the B-3 control valve 25 has its plunger 253 moved down by the line pressure ($P_L$) and its spool 251 becomes locked in the lowermost position of the drawing. The spool 241 of the B-2 release valve 24 is returned to the upper position shown in the drawing because the solenoid valve SL3 signal pressure ($P_{SL3}$) is released.

(2) 2nd→1st Shift Control Operations

Simultaneously with a shift decision in Step 7, the output of the linear solenoid valve SLU is increased to 100% to prepare for controlled draining of the brake B-3 pressure. In Step 9, the solenoid valve SL3 is switched from ON to OFF to bring the B2 release valve 24 to the righthand half position shown in the drawing to release the B-3 control valve 25 from its locked state. From this point on, the drainage of the brake B-3 pressure is directly controlled by the output of the linear solenoid valve SLU. After 1st speed (1st) synchronization in Step 10, the 1–2 shift valve 21 is changed at Step 11 to its 1st-speed state to interrupt the feed of the brake B-3 pressure. Finally, the solenoid valve SL3 is switched at Step 12 from OFF to ON to switch the C-0 exhaust valve to start the feed of the clutch C-0 pressure.

(3) 2nd→3rd Shift Control Operations

Simultaneously with a shift decision in Step 13, the output of the linear solenoid valve SLU is increased to 100% so that it is set to a value in accordance with the input torque when the solenoid valve SL3 is switched from ON to OFF. Next, the solenoid valve SL3 is switched from ON to OFF to bring the B-2 release valve 24 to the righthand half position shown in FIG. 1, so that the line pressure acting on plunger 253 is released through the B-2 release valve 24, to release the B-3 control valve 25 from its locked state. After this, the 2–3 shift valve 22 is switched to the 3rd-speed side to start the feed of the D-range pressure ($P_D$) through the 2–3 shift valve 22 to the servo means of the brake B-2. The B-3 control valve 25 regulates the brake B-3 pressure (as in period a) to maintain the minimum pressure necessitated by the rise of the brake B-2 pressure. The inertial phase is characterized by feedback control (as in period b), i.e. the back pressure control of the B-2 accumulator 27. In order to prevent simultaneous locking, a timer control turns ON the solenoid valve SL3 to interrupt the feed of the brake B-3 pressure and start the feed of the clutch C0 pressure by the B-2 release valve 24. At the end of the accumulation of pressure in the B-2 accumulator 27, the relay valve 26 is switched to shut the brake B-3 oil passage, thus completing the shift.

(4) 3rd-Speed (3rd) State The D-range pressure ($P_D$) is applied both to the end of the plunger 253, through the 1–2 shift valve 21, the 3–4 shift valve 23 and the B-2 release valve 24, and to the end of the plunger 252 through the 2–3 shift valve 22, to move the two plungers 253 and 252 upward together with the spool 251, enabled by the difference between their pressure receiving areas, so that the three components are locked abutting together while compressing the spring.

(5) 3rd→2nd Shift Control Operations

Prior to the switching of the 2–3 shift valve 22, the solenoid valve SL3 is switched in Step 19 from ON to OFF to bring the B-2 release valve 24 to the righthand half position shown in FIG. 1 to release the B-3 control valve 25 from its locked state and to start the feed of the brake B-3 pressure. In Step 20, the 2–3 shift valve 22 is changed to the 2nd-speed state to start drainage of the brake B-2 pressure through the small-orifice. By the fast fill of the brake B-3, the piston stroke is ended (as in period a) prior to the 2nd-speed (2nd) synchronization. In Step 21, the rotational speed change is controlled (as in period b) by the back pressure control of the B-2 accumulator 27. In high-speed running, the brake B-3 pressure is on standby at a low level and is elevated in accordance with the synchronization. In low-speed running, the brake B-2 pressure is held, and the synchronization is achieved by a gradual, controlled change in the brake B-3 pressure. After 2nd-speed (2nd) synchronization is attained, the solenoid valve SL3 is switched at Step 22 from OFF to ON to switch the B-2 release valve 24 to effect quick drainage of the brake B-2 and the quick application of the brake B-3, thus completing the shift.

(6) N→3rd Shift Control Operations

In this case, when the solenoid valve SL3 is ON, the signal pressure ($P_{SL3}$) is drained from the end of the spool 241 of the B-2 release valve 24 through the 3–4 shift valve 23 in the 3rd speed position and through the solenoid valve signal pressure oil passage 205, so that the spool 241 of the B-2 release valve 24 takes the lefthand half position shown in the drawing. As a result, the feed of the D-range pressure ($P_D$) from the oil passage 201b to the B-3 control valve 25 is interrupted by the valve 24. In this manner, it is possible to eliminate unnecessary pressure regulating operations of the B-3 control valve 25, which might otherwise occur at the time of a rise in the applying pressure of the brake B-2, i.e. the regulating action of the D-range pressure ($P_D$) as applied to the end of the plunger 253 through the 1–2 shift valve 21, the 3–4 shift valve 23 and the B-2 release valve 24 and the regulating action of the apply pressure of the brake B-2 received as the signal pressure at the end of the plunger 252 through the 2–3 shift valve 22. Thus, it is possible to prevent flow loss in advance.

In short, according to the control system of the embodiment thus far described, a force balancing the oil pressure applied to the control valve 25 from the brake B-2 (the frictional engagement element to be engaged in the gripchange shift), can be obtained, not by the external control signal pressure ($P_{SLU}$) itself, but by increasing the receiving area for the signal pressure. As a result, that extension of the output width of the external control signal pressure ($P_{SLU}$), which might otherwise be caused by unifying the valve, can be eliminated to prevent loss of accuracy. By the control of the relay valve 26 with the oil pressure coming from the brake B-2 (the second frictional engagement element), the oil pressure of the brake B-3 (the first frictional engagement element) can be released independently of the action of the control valve 25. As a result, the oil pressure of the brake B-3 is not confined, that is, the brake B-2 and the brake B-3 are prevented from being simultaneously fed with the oil pressure, even in case the control valve 25 sticks in the closed position.

Moreover, the simultaneous feeds of the oil pressure to the brake B-2 and the brake B-3 can also be prevented by the 3–4 shift valve 23. Specifically, when the B-3 control valve 25 sticks in the position feeding the D-range pressure ($P_D$) to the brake B-3 in a 2nd→3rd shift, the oil passage 201b is opened to communicate with the drain port EX through the 3–4 shift valve 23 by switching the 3–4 shift valve 23 to the 4th and 5th speed sides. Further, the signal pressure ($P_{SLU4}$) of the solenoid valve SL4 is applied, in place of the signal pressure (PSL3) of the solenoid valve SL3, to the spool end of the B-2 release valve 24 via the solenoid valve signal pressure oil passage 205, so that the spool 241 is held in the position shown as the righthand half in the drawing. Thus, the oil pressure of the brake B-3 is drained from the drain port EX of the 3–4 shift valve 23 by way of the oil passage 203b, the relay valve 26, the oil passage 203a, the B-3 control valve 25, the oil passage 201b and the B-2 release valve 24. As a result, the transmission establishes the 4th speed while preventing tie-up which might otherwise be caused by simultaneous feed of the oil pressure to the brake B2 and the brake B-3.

Figure 11:
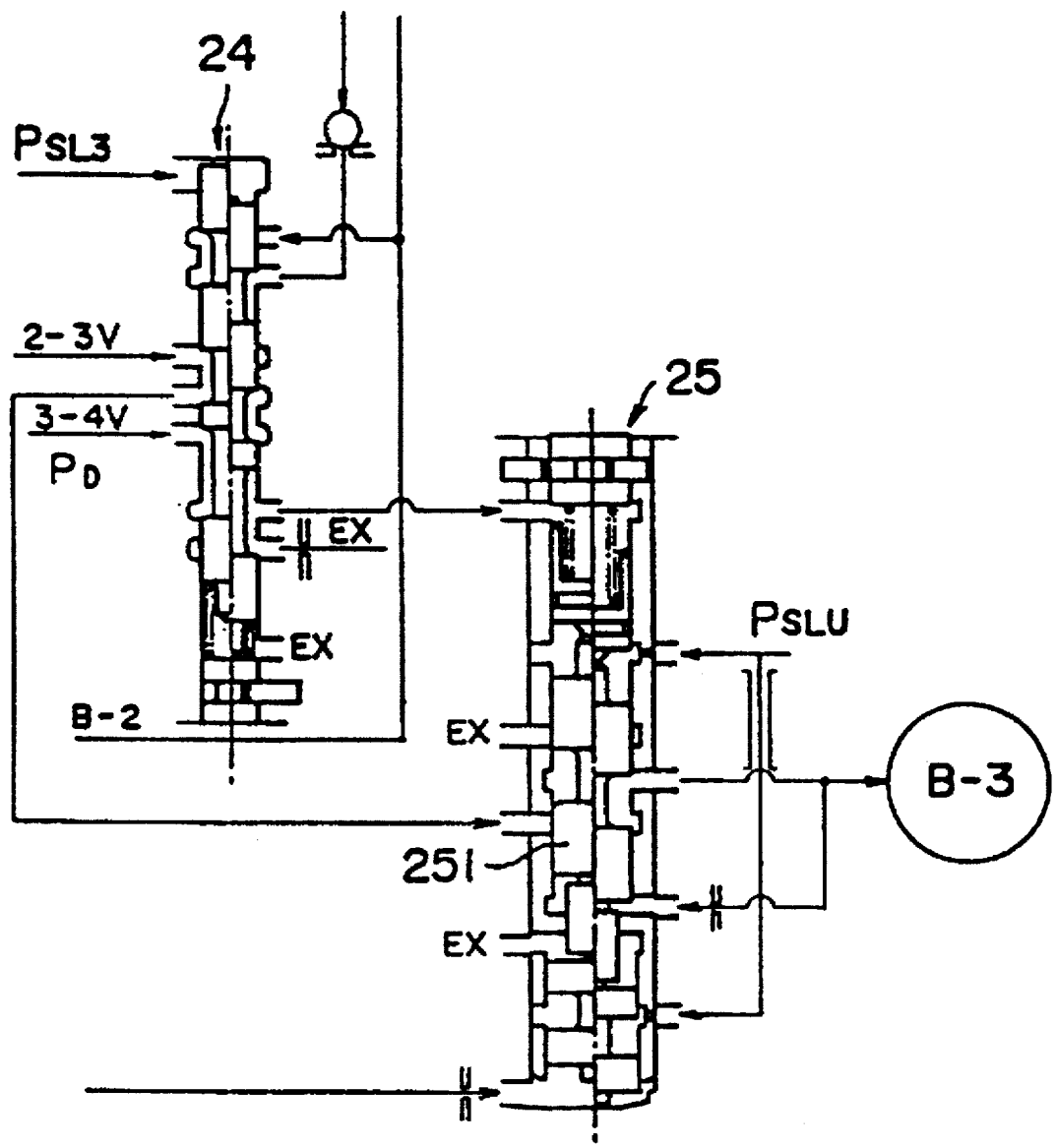
FIG. 11 is a partial hydraulic circuit diagram showing a second embodiment of the hydraulic control system.
Figure 12:
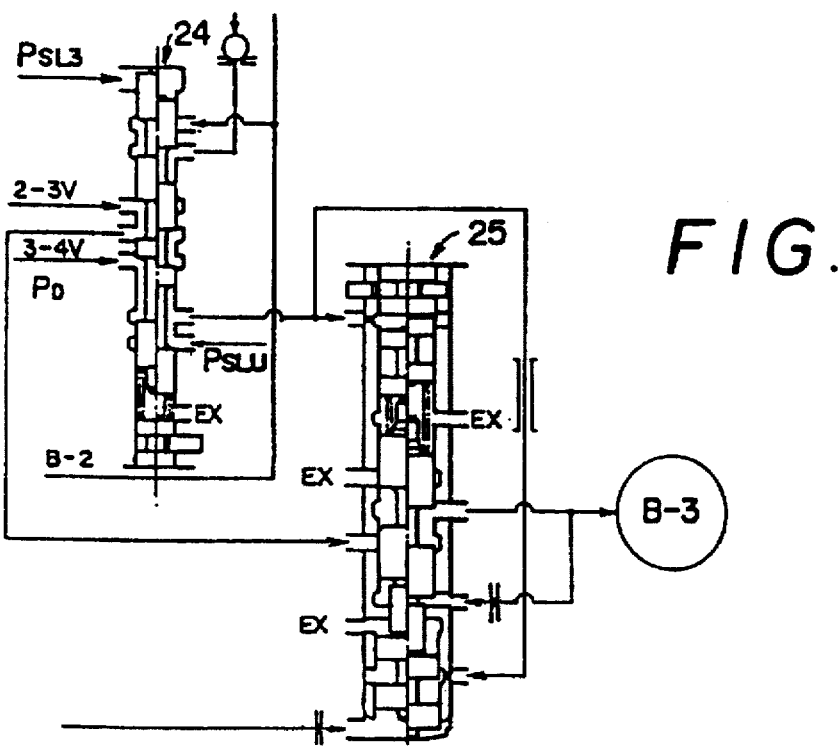
FIG. 12 is a circuit diagram showing a third embodiment of the hydraulic control system.
Figure 13:
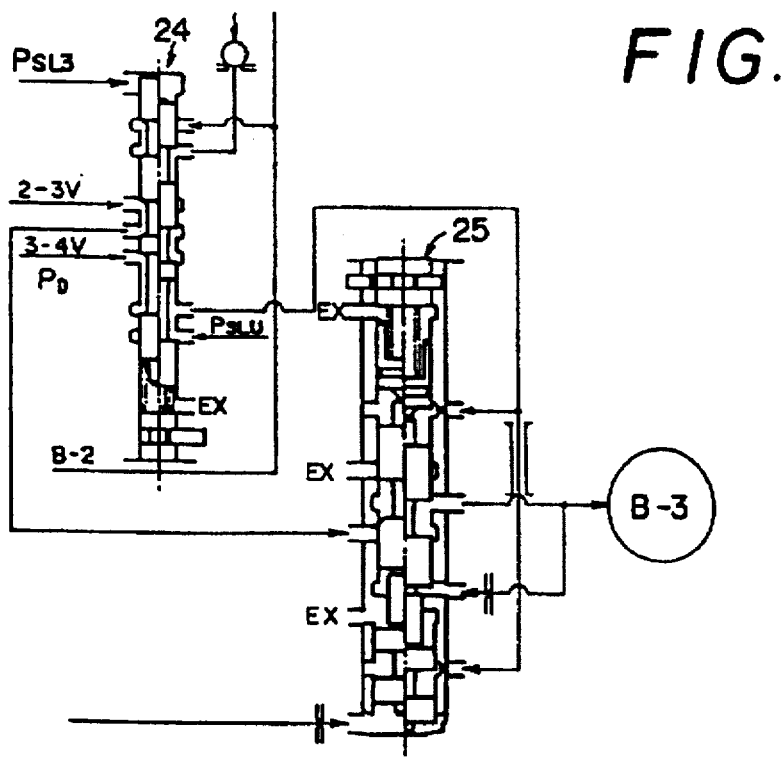
FIG. 13 is a circuit diagram showing a fourth embodiment of the hydraulic control system.

Application of the linear solenoid valve SLU pressure to the B-3 control valve 25 may be modified as shown in FIGS. 11 to 13. In these embodiments also, the D-range pressure ($P_D$) through the 3–4 shift valve may be interrupted by the B-2 release valve 24 at the time of a N→3rd shift, as in the embodiment of FIG. 1, by positioning the spool of the B-2 release valve 24 as indicated at the lefthand half of the drawing, to obstruct the feed of the D-range pressure ($P_D$) to the B-3 control valve 25.

FIG. 11 shows a modification in which the hydraulic circuit shown in FIG. 1 is slightly modified with respect to the B-2 release valve 24 and the B-3 control valve. In the embodiment of FIG. 1, the linear solenoid valve SLU pressure ($P_{SLU}$) and the spring load are applied in the spool 251 in the same direction, i.e., added, so that the pressure regulation must be with the low linear solenoid valve SLU pressure ($P_{SLU}$), with the disadvantage of low pressure regulating accuracy and responsiveness. In this modified embodiment of FIG. 11, on the contrary, those two forces are in opposition so that the pressure regulation can be made under a higher linear solenoid valve SLU pressure ($P_{SLU}$) to provide enhanced pressure regulating accuracy and responsiveness.

FIG. 12 shows another modified embodiment in which the linear solenoid valve SLU pressure ($P_{SLU}$) is applied to the control valve 25 of the embodiment of FIG. 1 through the B-2 release valve 24. FIG. 13 presents a further modification in which a similar construction is applied to the modified control valve 25.

Figure 14:
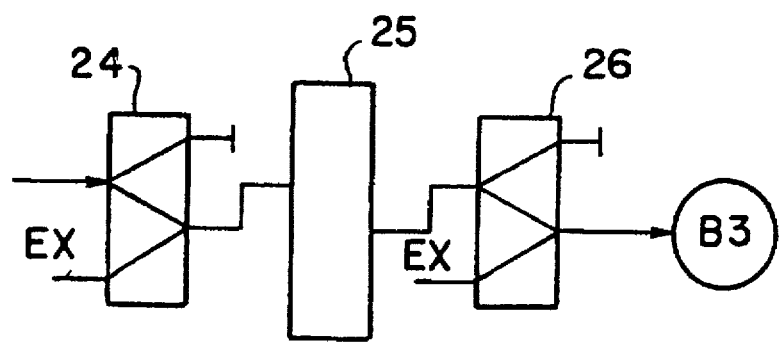
FIG. 14 is a schematic hydraulic circuit diagram showing a valve arrangement of the hydraulic control system in a first mode.

In the foregoing embodiments, as shown in FIG. 14, the feeding/releasing oil passage of the brake B3 communicates through the B-2 release valve 24, the B-3 control valve 25 and the relay valve 26 in this order, which order is intended to take advantage of elimination of the flow loss by controlling the B-2 release valve 24 with the solenoid valve SL3, in the N→D shift for a 3rd-speed starting, to interrupt the feed of pressure to the B- 3 control valve 25, and to take advantage of ensured drainage of the brake B-3 pressure by the relay valve 26, even if the brake B-3 pressure is confined due to an intermediate failure of the B-3 control valve 25. Moreover, in this embodiment the relay valve 26 is interposed in series between the B-3 control valve 25 and the brake B-3, as described above, so that the oil passage 203a may be shut off by the relay valve 26. At the time of a failure, when the relay valve 26 is locked in its drain state while the B-3 control valve 25 is in its apply state, the potential problem is eliminated because the brake B-3 pressure is drained from downstream of the B-3 control valve 25, while ensuring drainage between the B-3 control valve 25 and the brake B-3.

Figure 15:
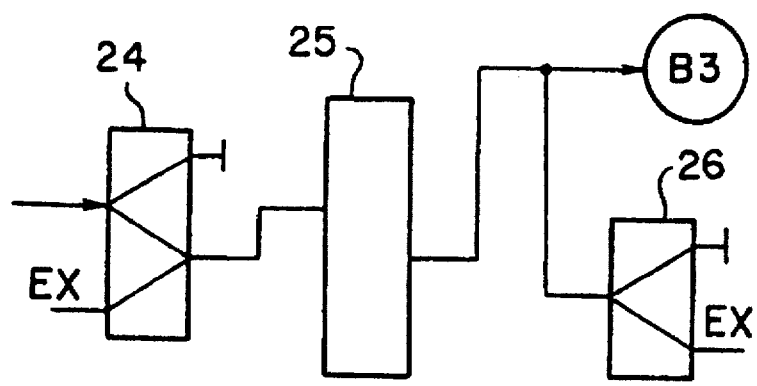
FIG. 15 is a schematic hydraulic circuit diagram showing a valve arrangement of the hydraulic control system in a second mode.
Figure 16:
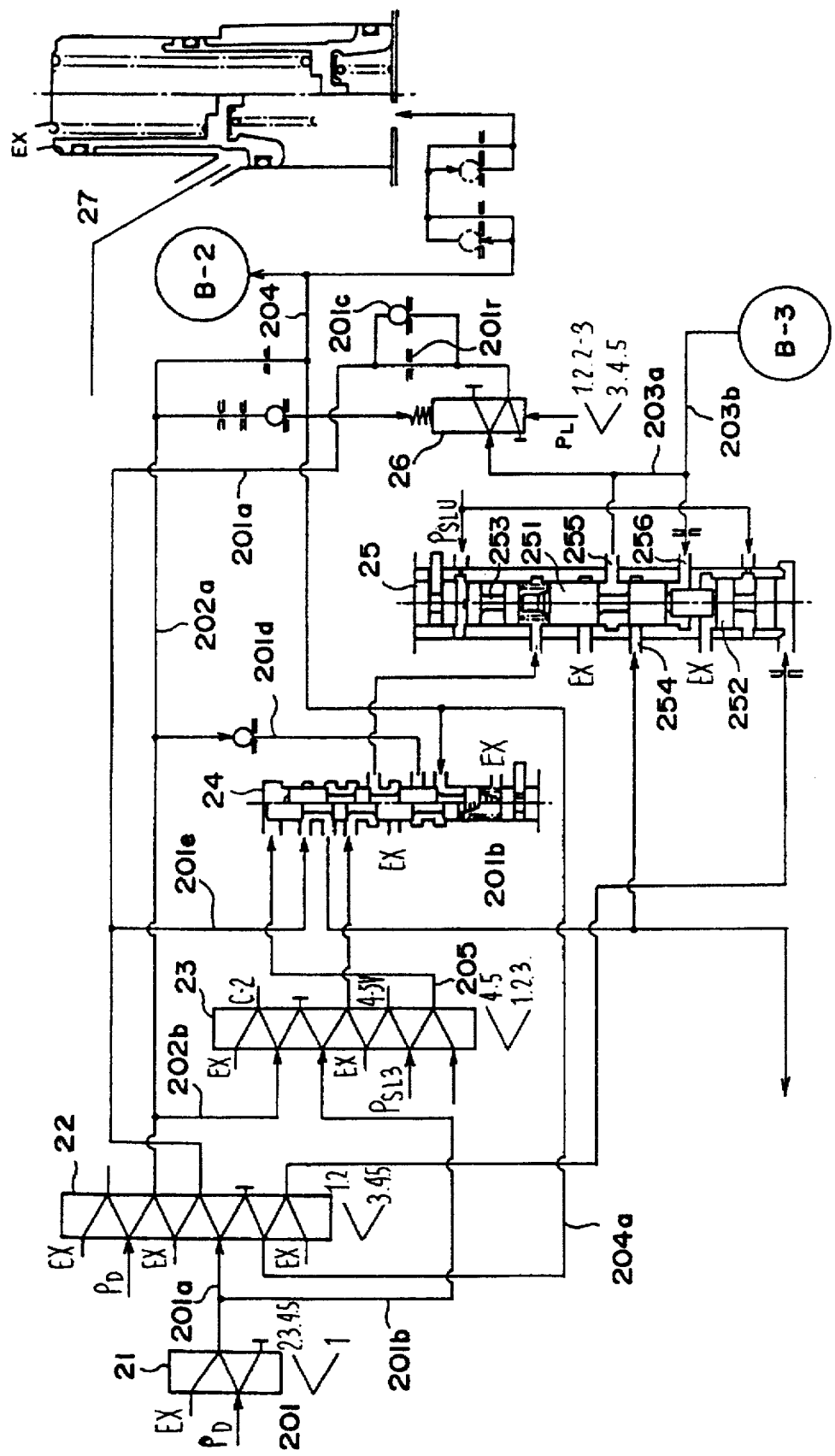
FIG. 16 is a hydraulic circuit diagram showing a portion of the circuit in more detail for the second mode.
Figure 18:
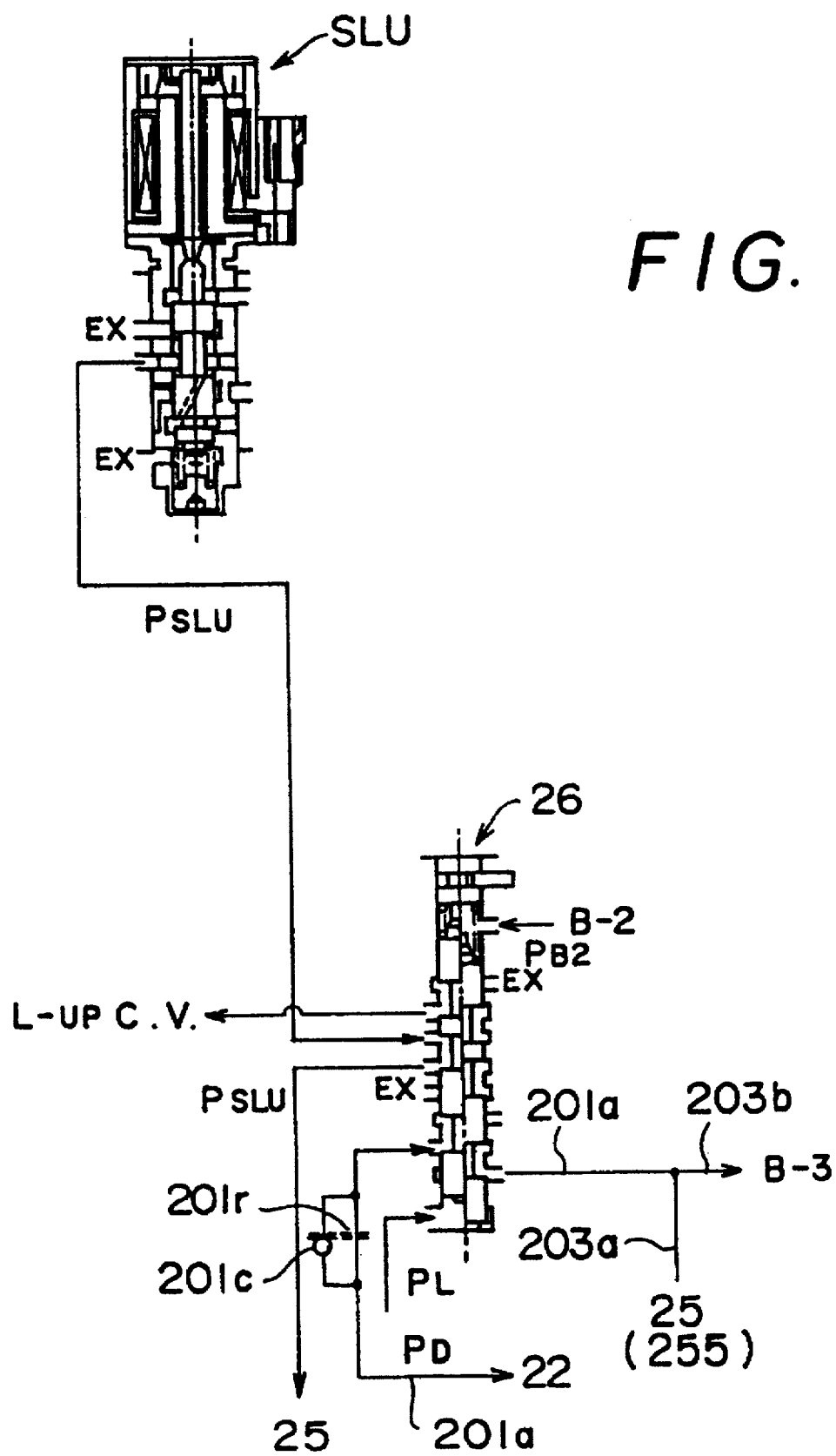
FIG. 18 is a partial hydraulic circuit diagram showing the detail of a relay valve in the second mode, together with its circuit connections.

As an alternative to the series arrangement in the aforementioned embodiment, wherein the relay valve 26 is interposed in the feeding/releasing oil passage of the brake B-3, the relay valve 26 may be connected in a branched manner with respect to the oil passage in accordance with the embodiment shown in FIGS. 15, 16 and 18. In this latter embodiment, the first oil passages 203a and 201a, located between the B-3 control valve 25 (first valve) and the brake B-3 (first frictional engagement element), are connected to the relay valve 26 to release the oil pressure from the brake B-3, responsive to the oil pressure coming from the brake B-2 (second frictional engagement element).

As shown in FIG. 16 and FIG. 18, the relay valve 26 is interposed in the oil passage 201a which is branched into the feeding/releasing oil passages 203a and 203b for the brake B-3. In this embodiment, moreover, the oil circuit connections are such that the linear solenoid valve SLU pressure ($P_{SLU}$) via the relay valve 26 is applied to the end of the plunger 253 of the B-3 control valve 25 and the D-range pressure ($P_D$) via the B-2 release valve 24 is applied between the spool 251 and the plunger 253.

Since the remaining portion of the circuit relating to the clutch C-0 is similar to that of the foregoing first embodiment, its description will be omitted and the corresponding elements are designated by the same reference characters.

With the latter construction, drainage from the relay valve 26 via the check valve 201c and the orifice 201r operates against any confinement of the pressure of the brake B-3 due to a failure of the B-3 control valve 25. As a result, a disadvantage not encountered in the first embodiment may occur as the additional failure of the relay valve 26. On the other hand, there is no resistance element, e.g., no valve for obstructing the feed and release of the oil pressure, in the first oil passage, i.e., the oil passage 203a and the oil passage 203b downstream of the B-3 control valve 25. As a result, it is possible to reduce the flow resistance to an extent not possible with the presence of an interposed valve. This reduction of flow resistance within the oil passage can improve the correlation of the oil pressure, at low temperature, to the regulating action of the B-3 control valve 25. As a result, the control accuracy of the B-3 pressure by the B-3 control valve 25 can be improved to reduce shift shock, e.g., in a 1st→2nd or 3rd→2nd shift applying the brake B-3.

In short, the relay valve arrangement according to this latter embodiment, is intended to ensure the drainage by the relay valve 26, even in the event of confinement of the pressure of the brake B-3 due to the intermediate failure of the B-3 control valve 25. However, because output from the relay valve 26 is branched between the B-3 control valve 25 and the brake B-3, as described above, this embodiment is intended to improve the control accuracy of the B-3 pressure by the B-3 control valve 25 rather than to warrant drainage at the time of failure of the B-3 control valve 25.

According to the first embodiment, the second valve, located in the first oil passage, is made separate from the first valve so as to feed/shut off the oil pressure of the first oil passage. Even if the oil pressure of the first oil passage cannot be regulated by the first valve in a grip-change shift, due to a malfunction in the first valve, it can be regulated by the second valve to prevent simultaneous feed to the first and second frictional engagement elements.

Moreover, the second valve may be arranged between the first valve and the first frictional engagement element so that it can reduce the oil pressure of the first oil passage responsive to the oil pressure coming from the second frictional engagement element. As a result, the oil pressure of the first oil passage can be reduced without fail to prevent simultaneous feed to the two frictional engagement elements. If the second valve has an oil passage capable of feeding the oil pressure to the first frictional engagement element, irrespective of the position of the second valve, the oil pressure to the first frictional engagement element can be held even if the second valve malfunctions.

If the second valve is able to regulate an oil pressure in addition to that of the first oil passage, the circuit can be made more compact by having the second valve perform a plurality of valve functions.

If the second valve shuts off the oil pressure to the first valve at the time of a shift from a gear stage in which both the frictional engagement elements are released, to the second gear stage, the oil pressure fed to the first oil passage is shut off from the first valve by the second valve at the time of starting the vehicle in the second gear stage, so that no useless pressure regulation by the first valve is performed, reducing flow loss. As a result, delay in the application of the second frictional engagement element can be prevented at the time of a shift from a gear stage in which the two frictional engagement elements are released, to the second gear stage.

The control system may further include a first changeover valve for switching the feed of the oil pressure from the first oil passage to the second oil passage at the time of a shift from the first gear stage to the second gear stage and a second change-over valve for feeding oil pressure to the first oil passage upstream of the first valve. As a result, a drop of the pressure for releasing the first frictional engagement element can be prevented by feeding oil pressure to the first oil passage, upstream of the first valve, by the second changeover valve, even during the switch transient time of the first change-over valve. According to this embodiment, therefore, it is possible to lighten shift shock in the automatic transmission.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission having a gear shift mechanism including first and second frictional engagement elements, respectively operated by first and second servo mechanisms, for establishing a first gear stage with said first frictional engagement element being applied and said second frictional engagement element being released and a second gear stage with said first frictional engagement element being released and said second frictional engagement element being applied, the control system including a hydraulic circuit comprising:
    a first oil passage for feeding an oil pressure to said first servo mechanism;
    a second oil passage for feeding an oil pressure to said second servo mechanism;
    first valve means located in said first oil passage for regulating the oil pressure of said first oil passage, responsive to the oil pressure of said second oil passage, during a shift from said first gear stage to said second gear stage; and
    second valve means for selectively feeding or shutting off the oil pressure of said first oil passage to and from said first servo mechanism.

2. A control system for an automatic transmission according to claim 1,
    wherein said second valve means includes a relay valve located in said first oil passage between said first valve means and said first servo mechanism for reducing the oil pressure of said first oil passage responsive to oil pressure of the second servo mechanism.

3. A control system for an automatic transmission according to claim 1, wherein said second valve means includes a change-over valve comprising:
    a valve member which is urged in one direction, toward a discharge position in which it discharges the oil pressure from said first servo mechanism, by the oil pressure of said second servo mechanism and is urged in a direction opposite said one direction by receipt of a line pressure, urging the valve member in a direction opposite said one direction, and
    a spring for biasing said valve member in said one direction, and
    wherein said change-over valve is switched to said discharge position when the oil pressure of said second servo mechanism reaches the line pressure.

4. A control system for an automatic transmission according to claim 1,
    wherein said second valve means includes a relay valve which is located in said first oil passage and is arranged in series with said first servo mechanism, and
    wherein said relay valve selectively discharges the oil pressure of said first servo mechanism and shuts off communication between said first oil passage and said first servo mechanism.

5. A control system for an automatic transmission according to claim 1,
    wherein said second valve means includes a relay valve located in an oil passage branched from said first oil passage and feeds the oil pressure of said first oil passage to said first servo mechanism irrespective of its position.

6. A control system for an automatic transmission according to claim 2, further comprising signal generating means for regulating the oil pressure of said first oil passage by feeding a signal pressure to said first valve means, whereby said second valve means regulates the oil pressure fed to said first valve means responsive to said signal pressure.

7. A control system for an automatic transmission according to claim 6,
    wherein said signal pressure generating means feeds the signal pressure to a control valve for controlling a lockup clutch, and
    wherein said second valve means switches the feed and shutoff of said signal pressure between said first valve means and the control valve.

8. A control system for an automatic transmission according to claim 1,
    wherein said second valve means includes a relay valve having a by-pass oil passage for feeding oil pressure to said first servo mechanism irrespective of its position.

9. A control system for an automatic transmission according to claim 8, further comprising an orifice in said by-pass oil passage.

10. A control system for an automatic transmission according to claim 9, further comprising a check valve arranged in said by-pass oil passage in parallel with said orifice.

11. A control system for an automatic transmission according to claim 1,
    wherein said second valve means regulates an oil pressure in addition to that of said first oil passage.

12. A control system for an automatic transmission according to claim 1,
    wherein said second valve means regulates the oil pressure to said second servo mechanism.

13. A control system for an automatic transmission according to claim 12, further comprising a bypass oil passage arranged in parallel with said second oil passage, and
    wherein said second valve means includes a valve member located in said bypass oil passage for selectively feeding or shutting off the oil pressure of said bypass oil passage to said second servo mechanism.

·14. A control system for an automatic transmission according to claim 12, further comprising signal pressure generating means for feeding a signal oil pressure to said valve member to switch said valve member to a position in which the oil pressure to said first valve means is shut off at the time of a shift wherein both said first frictional engagement element and said second frictional engagement element are being released.

15. A control system for an automatic transmission according to claim 1,
    wherein said second valve means shuts off the oil pressure to said first valve means at the time of a shift from a gear stage, in which both said first frictional engagement element and said second frictional engagement element are released, to said second gear stage.

16. A control system for an automatic transmission according to claim 1, wherein said second valve means includes a change-over valve for switching to a discharge position, responsive to a shift to a higher gear stage, to allow the oil pressure of said first servo mechanism to be discharged through said first valve means and said first oil passage.

17. A control system for an automatic transmission having a gear shift mechanism including first and second frictional engagement elements, respectively operated by first and second servo mechanisms, for establishing a first gear stage with said first frictional engagement element being applied and said second frictional engagement element being released and a second gear stage with said first frictional engagement element being released and said second frictional engagement element being applied, the control system including a hydraulic circuit comprising:

a first oil passage for feeding an oil pressure to said first servo mechanism;

a second oil passage for feeding an oil pressure to said second servo mechanism;

first valve means located in said first oil passage for, at the time of a shift from said first gear stage to said second gear stage, regulating the oil pressure in said first oil passage, responsive to the oil pressure of said second oil passage;

a first change-over valve for switching the feed of the oil pressure from said first oil passage to said second oil passage at the time of a shift from said first gear state to said second gear stage; and a second change-over valve for feeding the oil pressure to said first oil passage upstream of said first valve means.

18. A control system for an automatic transmission according to claim 17, wherein said second change-over valve is held in a predetermined position at the time of a shift from said first gear stage to said second gear stage, and wherein said first oil passage is connected to said second change-over valve while bypassing said first change-over valve.

* * * * *

UNITED STATES PATENT AND TRADEMARK OFFICE
CERTIFICATE OF CORRECTION

PATENT NO. : 5,725,451
DATED : March 10, 1998
INVENTOR(S) : TSUKAMOTO et al

It is certified that error appears in the above-indentified patent and that said Letters Patent is hereby corrected as shown below:

On title page, item

"[73] Assignee: Aisin AW Co., Ltd." should read --[73] Assignee: Aisin AW Co., Ltd. and Toyota Jidosha Kabushiki Kaisha--.

Signed and Sealed this

Tenth Day of August, 1999

*Attest:*

*Attesting Officer*

Q. TODD DICKINSON

*Acting Commissioner of Patents and Trademarks*